Aug. 12, 1924.

G. A. GILLEN

TRANSMISSION LOCK FOR AUTOMOBILES

Filed June 27, 1922

1,504,470

George A. Gillen, Inventor

By his Attorney
Maxwell Barus

Patented Aug. 12, 1924.

1,504,470

UNITED STATES PATENT OFFICE.

GEORGE A. GILLEN, OF JERSEY CITY, NEW JERSEY, ASSIGNOR TO GILLEN LABORATORIES CORPORATION, OF NEW YORK, N. Y., A CORPORATION OF DELAWARE.

TRANSMISSION LOCK FOR AUTOMOBILES.

Application filed June 27, 1922. Serial No. 571,173.

*To all whom it may concern:*

Be it known that I, GEORGE A. GILLEN, a citizen of the United States, and a resident of Jersey City, in the county of Hudson and State of New Jersey, have invented certain new and useful Improvements in Transmission Locks for Automobiles, of which the following is a specification, reference being had to the accompanying drawings, which form a part hereof.

My invention relates to transmission locks for automobiles to prevent theft and has for its object to provide such a lock which can be readily applied to cars in common use, such as Ford cars, which embody the planetary type of transmission. According to the present invention the automobile is locked in "neutral" so that the engine cannot be connected with the driving mechanism, except by the holder of the key. None the less the car may be readily moved to avoid traffic, fire hydrants, etc.

The accompanying drawings illustrate one form of my invention.

Figure 1:
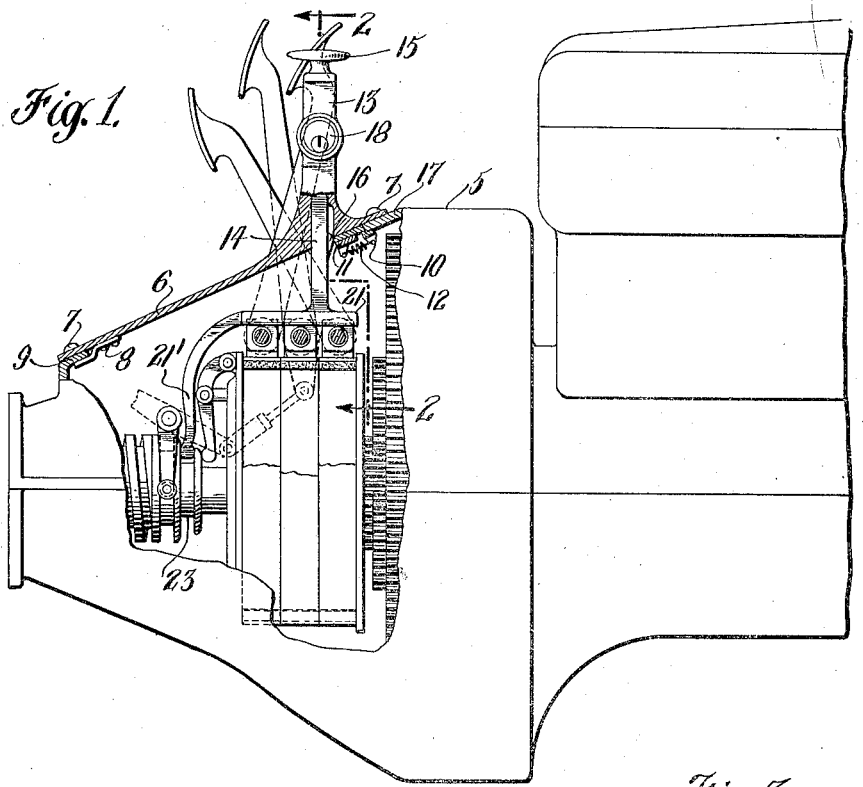
Fig. 1 is a fragmentary side view of an automobile transmission to which my device has been applied.
Figure 2:
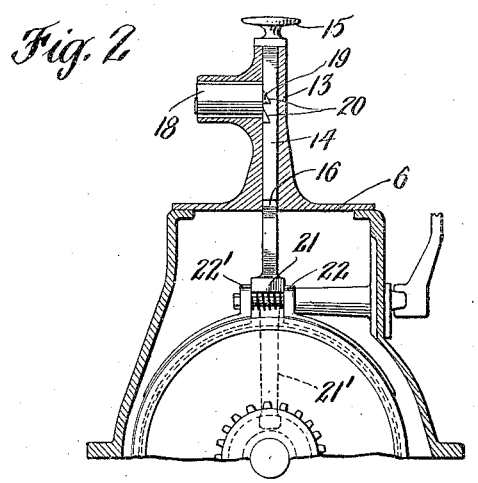
Fig. 2 is a sectional view from the rear on the line 2—2 of Fig. 1.
Figure 3:
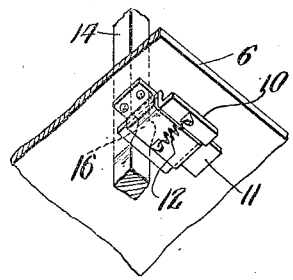
Fig. 3 is a detail of the cover plate locking mechanism.

Referring to the drawings, the transmission housing 5 is provided with the special cover plate 6 which is shaped to be readily substituted for the ordinary transmission housing cover plate and attached by screws 7. The rear end of cover plate 6 is provided with a flange 8, which fits beneath the rear lip 9 of the transmission housing. The forward end of the cover plate carries the spring bolt 10 which rides in the hasp 11 and is normally held in unlocked position by the spring 12. The cover plate 6 carries on its upper side the sleeve 13, in which slides the plunger 14, the sleeve and plunger being square or of other convenient shape to prevent rotation. The plunger 14 is topped by the knob 15, and is provided with a cam 16 at its rear side. The cam 16 is so positioned that when the plunger 14 is raised, this spring bolt 10 is automatically unlocked by its spring 12, but when the plunger is lowered, the cam 16 forces the bolt 10 beneath the forward lip 17 of the transmission housing. Thus when the plunger 14 is lowered, bolt 10 beneath the lip 17 and the flange 8 beneath the lip 9 cooperate to prevent the removal of the cover plate, even if the screws 7 which normally hold it be removed.

The sleeve 13 houses a lock 18 whose bolt 19 co-operates with a plurality of notches 20 in the plunger 14 to lock the plunger in lowered or raised position.

To the bottom of the plunger is attached the locking bar 21 which is adapted to fit between the ears 22 and 22' of each and every transmission band when such bands are expanded and prevent contraction thereof when the plunger 14 is in lowered position, and to ride freely above the ears 22 and 22' when the plunger 14 is raised so as to permit the transmission bands to function normally. The bar 21 is also provided with a downwardly curved toe 21' which is adapted when the plunger 14 is in lowered position, to insert itself in the clutch ring 23 thereby preventing engagement of the clutch and to ride freely above the clutch ring 23 when the plunger is in raised position so as to permit normal operation of the clutch. When the car is to be locked it is, of course, first put into neutral by operating the emergency brake or clutch pedal in the usual manner. Then the plunger 14 is shoved down and locked in that position thereby effectively preventing engagement of the clutch or any of the transmission bands. Thus the motor is effectively locked out of engagement with the driving mechanism.

It will be obvious from the foregoing that many changes may be made in the form and details of the mechanism above described without departing from the spirit and scope of my invention.

What I claim is:

1. In a transmission lock, a vertically movable plunger, means for locking the plunger in raised or lowered position, a locking bar at the lower end of the plunger for engagement between the ears of a series of transmission bands when the plunger is lowered, and a toe formed integrally with the bar for engagement in the clutch ring of a transmission when the plunger is lowered.

2. In a transmission lock, a vertically movable plunger, means to lock the plunger in raised or lowered position, a locking bar at the lower end of the plunger for engagement between the ears of a series of transmission bands when the plunger is lowered, a toe formed integrally at the rear end of the locking bar for engagement in the clutch ring of a transmission band when the plunger is lowered, and a bolt actuated by the plunger for securing the cover plate of a transmission housing in place.

3. The combination with a planetary transmission, and a housing for said transmission, said housing having a hand hole therein, of a cover plate for said hand hole, a lip at one end of the cover plate for engagement beneath one edge of the housing, a hollow sleeve near the opposite end of the cover plate, a plunger vertically movable through the sleeve, means to lock the plunger in raised or lowered position, a sliding bolt on the cover plate for engagement beneath the edge of the housing opposite the lip, a spring normally tending to withdraw the bolt, a cam on the plunger for holding the bolt projected when the plunger is in lowered position, a locking bar at the lower end of the plunger for engagement between the ears of the transmission bands when the plunger is lowered, and a toe on the bar for engagement in the clutch ring of the transmission when the plunger is lowered.

GEORGE A. GILLEN.